Figure 1:
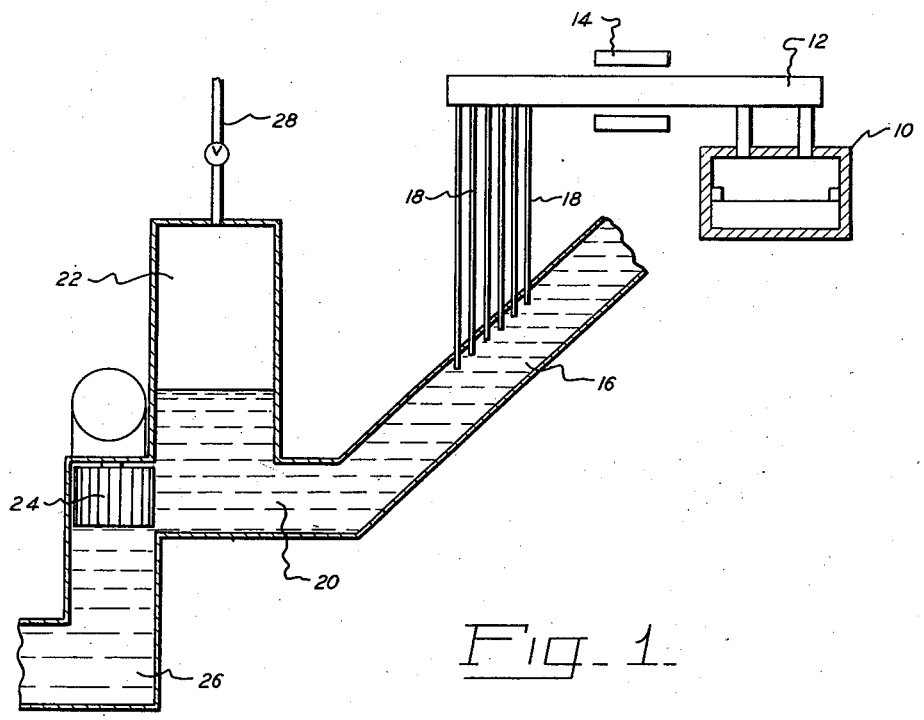

Sept. 2, 1947.                F. C. CARY                    2,426,669
            METHOD OF HANDLING AND UTILIZING LARGE
              VOLUMES OF GASES AT LOW PRESSURES
                       Filed Oct. 19, 1943

Inventor
FRANCIS C. CARY
By Beaman & Langford
Attorneys

Patented Sept. 2, 1947

2,426,669

UNITED STATES PATENT OFFICE 2,426,669

METHOD OF HANDLING AND UTILIZING LARGE VOLUMES OF GASES AT LOW PRESSURES

Francis C. Cary, Wilmington, Del., assignor to Sven E. Hybinette and himself, a partnership doing business as Hybinette and Cary, Wilmington, Del.

Application October 19, 1943, Serial No. 506,829

1 Claim. (Cl. 23—1)

This invention refers to reactions which produce large volumes of gases when operated at reduced pressure.

The reduction of silicon with carbon is one such reaction. For many uses it is advantageous to carry out such reactions at such low pressure that the product of the reaction is not fused and the metal is produced in granular form. If such reaction with silicon is carried out at about one tenth of one atmosphere instead of normal pressure such result is obtained. To produce 1000 pounds of Si per hour about 250,000 cubic feet of gas at one atmosphere if cooled to room temperature would be evolved. At .1 atmosphere and if cooled to 1½ times room temperature, the volume of gas to be removed would approximate 4,000,000 cubic feet. I know of no mechanical pump or turbine capable of handling such volume and produce such low pressure.

There are other reasons for desiring to carry out such reactions at reduced pressure. For instance, the value of ferro chromium varies inversely with its carbon content. Some metals like chromium will react with CO gas and form carbides which are detrimental to the metal and its use. The carbon content of such metals varies directly with the pressure of the CO gas over the reaction and by reducing the pressure of this gas, the carbon content of the product can be reduced to make metals and alloys more suitable and more valuable. Some such metals are now reduced only with silicon or other more expensive reducing agent to obtain low carbon metal whereas cheaper carbon can be used with my invention to produce such metals with low carbon content at reduced pressure.

The reduction of certain metals can be carried out at one atmosphere only at or above the boiling point of the metal produced with consequent large losses due to vaporization. By carrying such reactions out at reduced pressure, the temperature is reduced and less product is vaporized. Condensers are sometimes interposed to condense the metal vapors on some of such reactions and much of the metal vapor reacts with the CO gas before reaching the condenser and reverts to the oxide. By conducting such reaction at greatly reduced pressure, the reversion of the reaction is greatly minimized and most of the metal is recovered.

It is therefore an object of this invention to provide means to produce vacuum to carry on reactions which produce large volumes of gases.

It is a further object of this invention to make such gases available for use.

Other objects will appear herein.

I have found that by building the furnace adjacent to a hydraulic power station where large volumes of water is handled, the gas may be withdrawn by inserting Venturi tubes into the pennstock and collecting the gas in the surge tank from which it may be withdrawn. An efficiency of 70% may be realized. Under normal conditions various gases dissolve in water to some extent. Water will, for example, dissolve .00003 parts of CO by weight. In the example chosen above about .17,000 cubic feet per minute of water would dissolve all of the CO, assuming that complete solution would occur. For this reason, it may at times be best to construct a separate small pennstock for the handling of the gas. By the use of my invention it becomes possible by simple means to carry out reactions on a large scale that heretofore have been known only as laboratory curiosities.

The best method of constructing the suction apparatus is well known to those skilled in the art. Falling water has in fact been used for compressing air on a large scale. To the contrary I do not specifically wish to compress the gas to the high degree, say, over 50 lbs. per square inch, that such installations use. I prefer to withdraw the gas at a pressure of only a few inches of water. And on a small scale water under pressure has been used for the evacuation of apparatus. By building the furnace near a dam where large volumes of flowing water is available, I have by simple and known means solved problems of old standing. Thus, to return to the example of silicon, I am able by this means to produce pure silicon of a purity exceeding that of commercial silicon metal at a cost of about one tenth or one fifteenth of the cost of the old product and by collecting the gas at the surge tank made it available for other uses.

In the drawings a diagrammatic view of my system in one form is illustrated.

Referring to the drawings, the CO gases are withdrawn from the closed furnace 10 through the conduit 12 past the heat exchanger 14 and discharged into the pennstock 16 through the Venturi nozzle 18. The flow of water down the pennstock will draw off the CO gas and entrain the gases until the expansion zone 20 is reached, at which point the gas bubbles expand up into the surge tank 22, the water free of the gas pouring through the wheel 24 and tail race 26. The CO gas stored and compressed in the surge tank 22 is conducted off as needed through the discharge 28.

There are many reactions producing gases other than those specifically mentioned which are beneficially operated at reduced pressure, and there are many other reactions producing gases where the product is made more suitable for future use. It is not intended that this invention be limited to only those specifically mentioned, but shall be construed broadly to apply to any and all such reactions.

I therefore claim:

A method of economically operating an enclosed furnace in which a reaction is had which produces large volumes of gases, adjacent a dam and utilizing the falling water to produce a subatmospheric pressure, comprising the step of withdrawing the gases from the furnace by suction upon the gas through discharge of the same into the pennstock, entraining the gases as bubbles in the water to a point adjacent the surge tank, collecting the gas in the surge tank and withdrawing the gases from the surge tank as required.

FRANCIS C. CARY.

REFERENCES CITED

The following references are of record in the file of this patent:

UNITED STATES PATENTS

| Number | Name | Date |
|---|---|---|
| 2,212,135 | Titlestad | Aug. 20, 1940 |
| 2,130,382 | Copeland | Sept. 20, 1938 |

FOREIGN PATENTS

| Number | Country | Date |
|---|---|---|
| 37,933 | Austria | July 10, 1909 |
| 12,187 | Switzerland | Apr. 22, 1896 |
| 15,511 | Norway | Feb. 6, 1906 |